March 18, 1969  C. A. ERDMAN  3,434,159
RECORDER HAVING STYLUS PRESSURE ADJUSTMENT ASSEMBLY
Filed Aug. 14, 1967
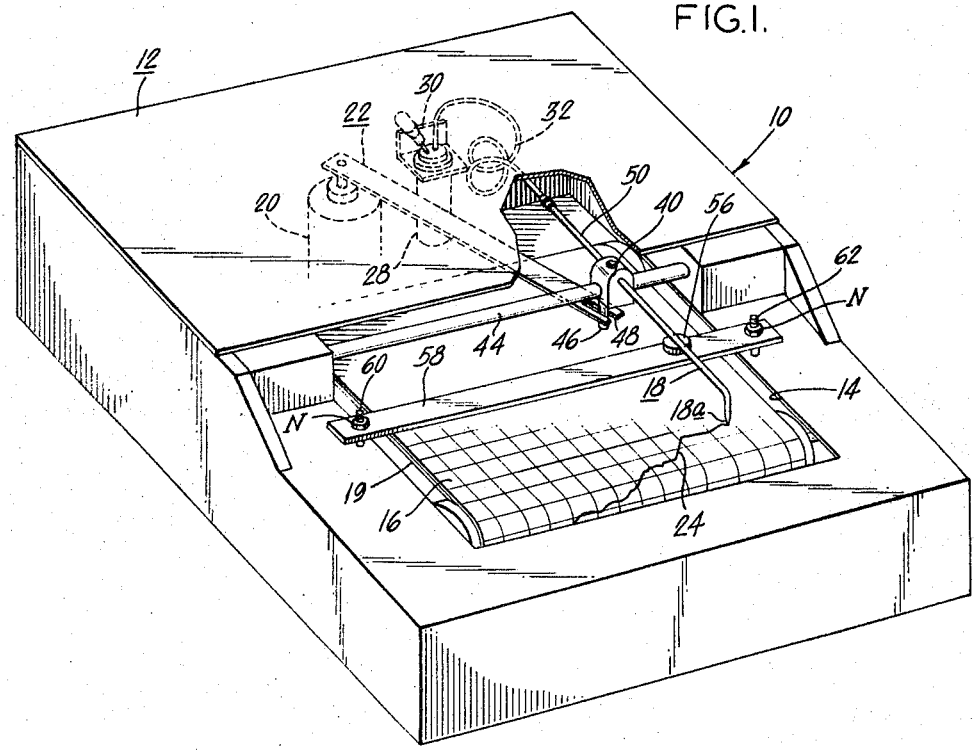
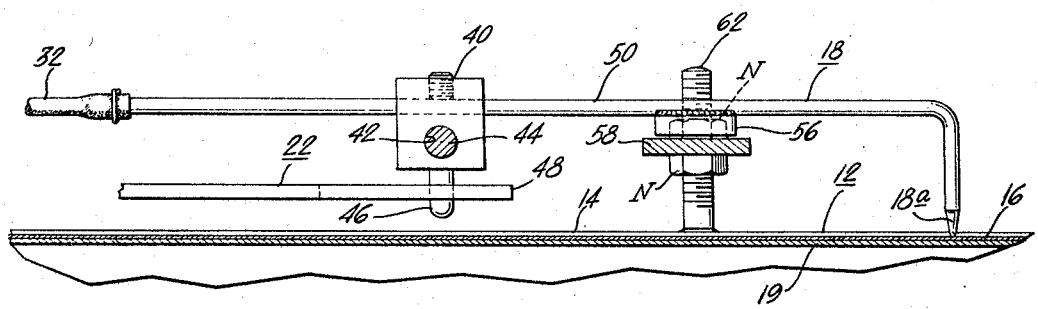
INVENTOR:
CHARLES A. ERDMAN
BY Howson & Howson
ATTYS.

United States Patent Office 3,434,159
Patented Mar. 18, 1969

3,434,159
RECORDER HAVING STYLUS PRESSURE ADJUSTMENT ASSEMBLY
Charles A. Erdman, Marlton, N.J., assignor to Venus Esterbrook Corporation, Cherry Hill, N.J., a corporation of New York
Filed Aug. 14, 1967, Ser. No. 660,431
U.S. Cl. 346—139           3 Claims
Int. Cl. G01d 15/18

ABSTRACT OF THE DISCLOSURE

A mounting means for a stylus assembly in a recording device having a movable recording medium and means for actuating the stylus in response to changes in a variable condition to record a trace on the recording medium comprising a magnet carried by said stylus and a bar of magnetic material extending generally transversely of the recording medium which is adjustable relative to the magnet to selectively vary the air gap between the magnet and bar whereby the pressure applying relation of the stylus tip on the recording medium may be selectively controlled.

---

The present invention relates to recording instruments and more particularly to improvements in the type of recording instrument commonly referred to as a "chart recorder."

These recording instruments are generally employed to record on a chart changes in a variable condition for example pressure and temperature variations. To this end, these recording instruments usually comprise a housing, means for moving a chart in the form of strip paper relative to a stylus or pen assembly supplied with ink through a capillary tube from an ink supply, the pen arm assembly being suitably adapted for movement in response to changes in a given variable condition. The pen arm assembly is generally biased by mechanical means, many times a spring to maintain the writing tip in contact with the chart.

These prior chart recorders have several disadvantages and drawbacks particularly in relation to the mounting means for maintaining the writing tip in pressure relative to the chart paper. For example, it has been found with these mounting arrangements, it is difficult to control the pressure of the stylus tip on the paper or recording medium.

In the operation of these recording devices, the continuous contact of the writing tip on the recording medium, for example chart paper, draws a writing fluid such as ink through the stylus from the ink supply by capillary action and if the contact between the writing tip and recording medium is broken, the ink feed may stop, necessitating repriming. Accordingly, maintaining a predetermined uniform pressure application between the writing tip and the recording medium is essential to insure recording a continuous trace on the recording medium.

Erratic pressure applying relation between the writing tip and the recording medium or variations therein produce undesirable effects or results. For example, if the pressure applying relation is too great, an unduly large force is required to actuate the stylus in response to changes in the variable condition. In some instances, particularly during rapid or sudden changes in the variable condition being measured which produce rapid or sudden movements in the writing tip, the trace formed does not accurately reflect the actuating signal. Hence, the accuracy of the unit is adversely affected. If the pressure is too light, the trace developed is intermittent in some cases, particularly when the writing tip is moved through large increments rapidly. Moreover, it has been observed that during sudden large displacements of the writing tip, the writing tip slings ink producing blotches on the recording medium which obviously is undesirable. Further, if the pressure applying relation is not great enough, and the writing tip is raised slightly from the recording medium, flow of ink to the writing tip will stop and accordingly no trace is produced.

It is noted that the problem of breaking contact with the paper and the necessity for maintaining precise predetermined pressure applying relationship between the writing tip and the paper is particularly critical in "high-rise" systems where the writing tip may be located four or five inches above the ink supply. In these systems if contact is broken, it may be necessary to re-prime the ink supply to initiate flow to the writing tip.

Maintaining a predetermined uniform pressure between the tip and the recording medium is important for the reason that if the pressure is too great, the tip tends to skip and stick and if it is not great enough, the stylus tip will not be maintained on the paper particularly during rapid movements of the pen relative to the recording medium. Furthermore, if the pressure is not of a predetermined uniform character, the consistency of the line produced is affected. Additionally, the accuracy of response of the pen arm assembly to the actuating means is affected by, for example, too great or too little pressure of the stylus tip on the paper.

The present invention is designed to provide a comparatively simplified stylus or pen mounting arrangement wherein there is controlled pressure between the writing tip and the recorder chart and the pressure of the tip on the chart is maintained constant or uniform throughout the range of movement of the pen arm assembly. To this end in a chart recorder of the type illustrated the stylus mounts a magnet overlying and slightly spaced from a magnetic rail mounted on the housing to provide a desired air gap between the magnet and rail.

The rail in the case of a horizontal or vertical unit extends transversely relative to the direction of feed of the recording medium. By this arrangement, the height of the rail may be set relative to the height of the tip to provide a predetermined desired attracting force between the magnet and the rail and in turn a predetermined desired pressure applying relation between the writing tip and the recording medium. This arrangement is extremely simple and minimizes the amount of direct interengagement of the parts effecting movement of the stylus to provide for a more fluid movement of the pen relative to the recording medium and one wherein there is controlled pressure between the writing tip and the recording medium. Furthermore, the arrangement is comprised of relatively few parts so that the cost is reduced and the entire assembly is much more economical to manufacture. Additionally, by the stylus mounting arrangement of the present invention, wherein a continuous predetermined pressure applying relationship between the writing tip and the recording medium is maintained during operation thereof, the problem of interruption of the supply of writing fluid to the tip, which in some cases necessitates repriming in prior devices as noted previously, is obviated.

With the foregoing in mind, an object of the present invention is to provide a novel stylus mounting arrangement for a recording instrument wherein the pressure of the stylus tip on the recording medium may be accurately controlled and maintained uniform for all movements of the pen arm assembly.

Still another object of the present invention is to provide a stylus mounting arrangement which is of extremely simplified construction and arrangement and which is useful for the purposes intended.

These and other objects of the present invention and the various features and details of the operation and construction thereof are hereinafter more fully set forth with reference to the accompanying drawings, wherein:

FIG. 1 is a perspective view partly in section of a recording instrument embodying a pen arm mounting assembly in accordance with the present invention; and FIG. 2 is an enlarged view of the details of the mounting arrangement.

Referring now to the drawings, and particularly to FIG. 1 thereof, there is illustrated a diagrammatic form of recording instrument generally designated by the numeral 10 incorporating a stylus mounting assembly or arrangement in accordance with the present invention. It is noted that the recording instrument illustrated is of horizontal type. However, the principle of the invention applies also to vertical chart recorders or round chart recorders having a disc-type recording medium.

The recording device 10 includes a generally enclosed housing 12 having a window opening 14 therein to expose the strip chart 16 which is suitably mounted on rollers to be driven for movement relative to the marking stylus or pen 18 and back up plate 19 for recording medium in the area below the writing tip. The stylus 18 in the present instance is a hollow tubular member having an opening of predetermined cross section extending therethrough to deliver a writing fluid to the writing tip 18a by capillary action.

The stylus assembly 18 is suitably mounted for movement in response to changes in a variable condition sensed by a sensing member 20 through a linkage 22. Thus, in operation as a recording medium, such as the strip chart 16, is moved relative to the stylus, changes in a variable condition sensed by the sensing element 20 effect through the linkage 22 movement of the stylus 18 relative to the chart to record a trace 24 thereon. Suitable means is provided for supplying the stylus 18 with a marking fluid generally of the type shown in the Summers et al. Patent No. 3,046,556. This ink supply means includes a cartridge 28 mounted on a bracket 30 in the housing and a flexible tube 32 connecting the cartridge to the inner end of the stylus assembly 18. This system supplies ink to the writing tip 18a of the stylus by siphonic action. It is, of course, to be understood that details of the recorder described above are generally conventional and that the particular arrangement described and shown is merely for the purpose of illustration and that various other conventional strip chart recording structures may be employed in lieu of that shown and described.

In accordance with the present invention, a novel support means is provided for supporting the stylus or marking pen to provide a predetermined, uniform pressure applying relation between the stylus tip and the recording medium. To this end, the stylus assembly 18 is mounted in a carriage 40 adapted for movement along a rod or shaft 44 supported on the housing and extending transversely relative to the direction of movement of the strip chart. The carriage has an opening 42 therein to fit over the rod 44 with a slight clearance to facilitate reciprocating movement of the carriage. In the present instance the carriage mounts a depending finger 46 which engages the bifurcated outer terminal end portion 48 of the link 22 so that upon rotational movement of the link 22 through changes in the variable condition being measured, the carriage and stylus are moved along the rod 44 and transversely relative to the recording medium 16. Further, the stylus which as illustrated, has an elongated body portion 50 secured at one end to the flexible tubing 32 and in the present instance the tip 18a formed integrally at its opposite end and depending transversely therefrom, is provided with a disc-like magnet 56 which overlies a bar or rail 58 of magnetic material. As illustrated in FIG. 2, the magnet 56 is adapted to be slightly spaced from the bar 58 to provide an air gap between the magnet 56 and the upper surface of the bar 58, when the stylus tip engages the recording medium. The air gap between the magnet and the bar may be selectively varied to increase or decrease the pressure applying relation between the stylus tip and the recording medium and to this end the bar 58 is supported on threaded studs 60 and 62 carried by the top wall of the housing on opposite sides of the window opening 14. These studs mount adjusting nuts N on either side of the bar so that the bar or rail may be raised or lowered.

For example, if the pressure applying relation between the stylus tip and paper is greater than desired, the nut is simply threaded downwardly to lower the bar thereby increasing the air gap between the magnet and bar. On the other hand, if the pressure between the stylus tip and the recording medium is not great enough, the bar is simply raised to decrease the gap between the magnet and the bar. In this manner, the pressure applying relation between the stylus and recording medium is maintained uniform for the entire range of movement of the stylus. Furthermore, by this arrangement the various undesirable features of the spring biasing means of prior type stylus mounting assemblies are eliminated. Further, this is an extremely simplified mounting arrangement and one which is economical to make and one wherein the adjustment to provide the desired pressure applying relation is extremely simple.

I claim:

1. In a recording device including a housing; a movable recording medium consisting of a strip chart and means in the housing for moving said strip chart in a predetermined direction; a stylus assembly having a writing tip at one end thereof and connected to a suitable source of marking fluid to deliver marking fluid to said writing tip, and means for actuating the stylus in response to changes in a variable condition to record a trace on said strip chart; and mounting means for maintaining said writing tip in predetermined pressure-applying relation with said strip chart, said mounting means comprising a magnet carried by said stylus and in spaced relation above said strip chart, a bar of magnetic material mounted on said housing in spaced relation below said magnet, said bar overlying and extending transversely relative to said strip chart, and means for adjusting said bar relative to said magnet to selectively vary the distance between said bar and said magnet whereby the pressure applying relation of said writing tip on said strip chart may be selectively controlled, said bar mounting means comprising a pair of threaded studs projecting upwardly from said housing, said bar being provided with openings adjacent its terminal ends to fit over said studs, and adjustable fastening means on said studs movable relative thereto to vary the position of said bar to thus vary the gap between the upper face of said bar and said magnet.

2. A recording device as claimed in claim 1 including a mounting rod on said housing, and extending transversely of said strip chart, and wherein said stylus assembly includes a carriage having an opening therein through which opening said mounting rod extends, whereby said stylus assembly is slideable along said mounting rod to permit movement of said stylus assembly along said mounting rod in a transverse direction relative to said strip chart.

3. A recording device as claimed in claim 2 including sensing means for sensing changes in said variable condition, and a linkage connected to said carriage for actuating said stylus assembly in response to changes in said variable condition.

References Cited

UNITED STATES PATENTS

| | | | |
|---|---|---|---|
| 2,733,118 | 1/1956 | Stamper | 346—139 |
| 2,955,895 | 10/1960 | Buoymaster et al. | 346—139 X |
| 3,245,084 | 4/1966 | Kuyt | 346—139 |

FOREIGN PATENTS

| | | |
|---|---|---|
| 148,999 | 5/1921 | Great Britain. |
| 633,527 | 8/1936 | Germany. |

RICHARD B. WILKINSON, *Primary Examiner.*

J. W. HARTARY, *Assistant Examiner.*

U.S. Cl. X.R.

346—112